March 25, 1969 J. R. EVANS ET AL 3,435,418

RECORD RETRIEVAL AND RECORD HOLD SYSTEM

Filed May 27, 1965 Sheet 1 of 2

INVENTORS
JAMES R. EVANS
THOMAS H. ROWE

BY Ronald J. Clark

ATTORNEY

March 25, 1969 J. R. EVANS ET AL 3,435,418

RECORD RETRIEVAL AND RECORD HOLD SYSTEM

Filed May 27, 1965 Sheet 2 of 2

United States Patent Office 3,435,418
Patented Mar. 25, 1969

3,435,418
RECORD RETRIEVAL AND RECORD HOLD SYSTEM

James R. Evans, Endicott, and Thomas H. Rowe, Endwell, N.Y., assignors to International Business Machines Corporation, Armonk, N.Y., a corporation of New York Filed May 27, 1965, Ser. No. 459,400
Int. Cl. G11b *13/00, 5/00;* G11c *15/00*
U.S. Cl. 340—172.5 3 Claims

ABSTRACT OF THE DISCLOSURE

The present invention pertains to a record retrieval circuit for use in a data processing system comprising a bulk storage unit for storing a plurality of records operating in a response to a plurality of central processing units. Means are included for preventing the concurrent retrieval by more than one processor of the same record held in the bulk storage unit. A first processing unit must finish its operation within a respective record prior to releasing that record for additional processing by a second processing unit.

This invention relates to record retrieval systems and, more particularly, to a record retrieval system having a record hold feature.

Data processing systems frequently are interconnected by a common bulk storage unit (BSU). The BSU may comprise a random access disc storage unit or a strip storage device. Regardless of the nature of the BSU, more than one processing unit has access thereto. Each processing unit refers to the records in the common BSU and processes these records according to its own program. Occasionally, each processor refers to the same record concurrently. For example, in an inventory operation a certain record may be retrieved and changed by one processor and before the updated information is returned and substituted for the current record, a second processor retrieves the current record and changes the current record. Thereafter, the results of the first processor are substituted for the current record followed almost immediately by the results of the second processor. In this instance, the change made by the first processor is not reflected in the record in the BSU and is lost thereby introducing an error into the inventory records.

An object of the instant invention is to provide a record retrieval system which prevents interconnected processors from concurrently operating on a single record.

It is an object of the instant invention to provide a record retrieval system which prevents a single processor from concurrently operating on the same record in response to different commands in its program.

It is a further object of the instant invention to maintain a directory of record addresses which are presently being processed by interconnected processors.

It is another object of the instant invention to provide a record retrieval system which signals a record requesting processor that the requested record is presently being processed by a second processor.

It is a still further object of the instant invention to provide a record retrieval system which signals an associated file control unit that the record retrieval command applied to the file control unit may be completed.

Figure 1:
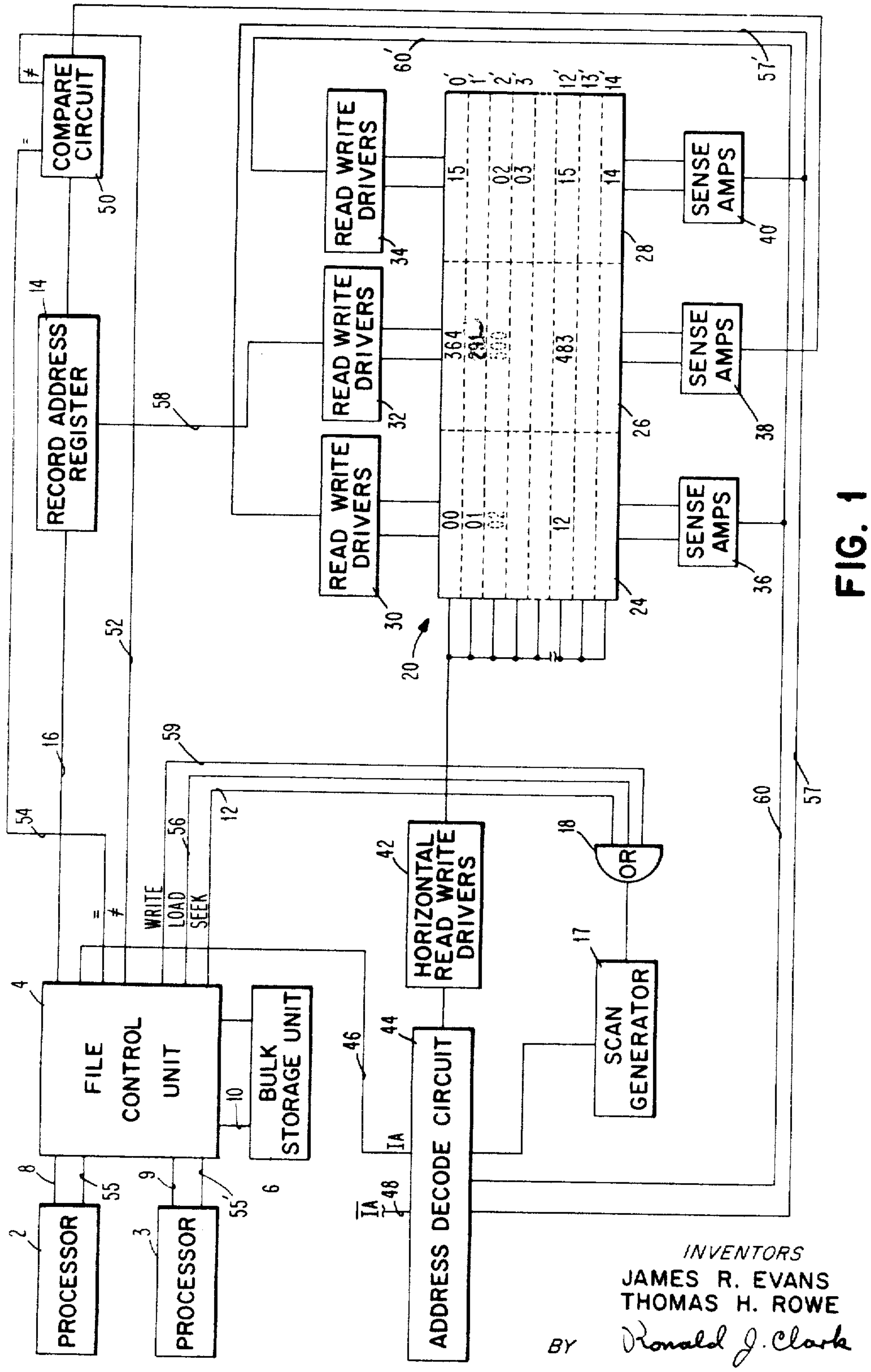
Figure 2:
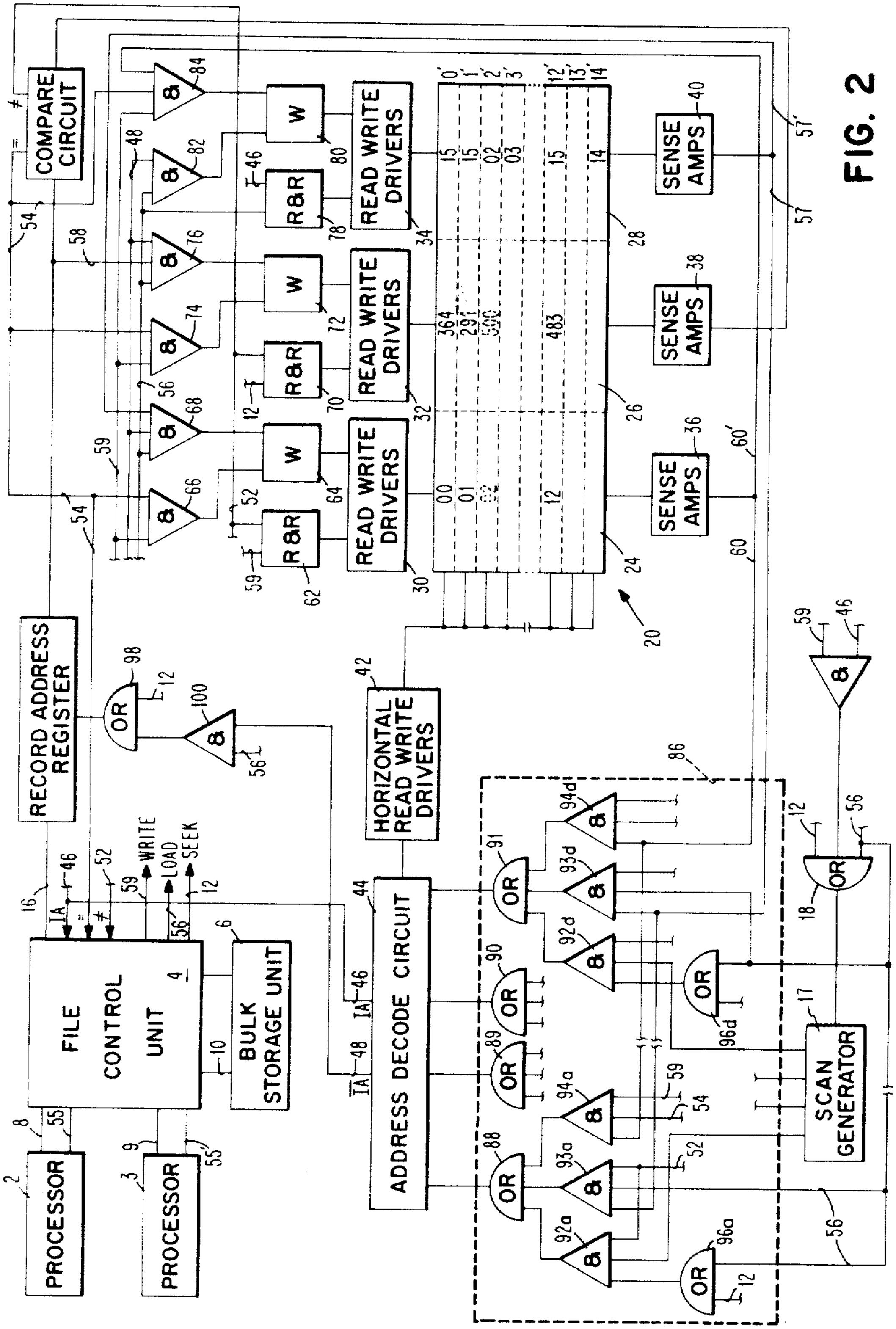

The foregoing and other objects, features and advantages of the invention will be apparent from the following more particular description of preferred embodiments of the invention, as illustrated in the accompanying drawings, wherein FIG. 1 is a generalized block diagram of the instant invention; and FIG. 2 is a more specific block diagram of the instant invention.

The same numerals are used in all the figures to represent the same elements.

Referring to FIG. 1, a plurality of processors 2 and 3 are the sources of all record retrieval commands. A file control 4 lies intermediate the processors 2 and 3 and a bulk storage unit 6. It is the function of the file control unit (FCU) 4 to receive a plurality of different commands from each of the processors and to generate the plurality of control signals required to execute each separate processor command. Such file control units are well known and thus are not described in detail. However, certain funtcions peculiar to a FCU operating with the instant invention are described in detail hereinafter.

The processor 2 and the processor 3 send a command word to the FCU 4 over Out Busses (OB) 8 and 9 respectively. For the purpose of this description, the OB 8 carries at one time a signal indicating that a record retrieval operation is to be performed and giving the address indica of the record which is to be retrieved. The first command signal is operative to begin the movement of the mechanical selection mechanism common to most BSU's. In the broadest sense, the record retrieval command signal is the first contact the processor 2 has with the BSU 6 and this contact has been selected as the time at which the availability of the record can be checked. Actually, any subsequent contact with the BSU can be selected as the time during which the record availability can be ascertained.

In addition to performing its usual function of controlling the mechanical selective mechanism in the BSU by a control line 10, the FCU 4 generates a SEEK control signal on a line 12. The address of the desired record is transferred to a record address register 14 by a line 16.

The line 12 is connected to a scan generator 17 by an OR gate 18. The generator 17 is employed to generate in a sequential manner a plurality of binary addresses. For example, the generator 17 comprises four triggers interconnected to form a binary counter. The resulting counter has a reset condition of the binary zero condition and is capable of advancing upon the application of successive enabling signals from a timing source, not shown, to a maximum count of fifteen. The advance through all conditions is automatic and is controlled by an enabling signal from the OR gate 18. The generation of all binary addresses between the zero address and the binary fifteen address is referred hereinafter as the scan routine.

A storage circuit 20 is provided to store the various indicia required by the instant invention. The circuit 20 comprises a plurality of storage positions arranged in horizontal rows 0′ through 14′. The circuit 20 is subdivided into a plurality of sections 24, 26 and 28 by a plurality of read-write driver circuits 30, 32 and 34 respectively. Each of the sections 30, 32 and 34 is equipped with a sense amplifier circuit 36, 38 and 40 respectively. The storage circuit 20 operates in a standard coincident current mode. One of the horizontal rows is furnished a half select enabling current by a horizontal read-write driver circuit 42, while the remaining half select current is furnished to one of the sections by a corresponding driver 30, 32 and 34.

The output signals from the scan generator 17 are applied to a standard decode matrix address decode circuit 44. As previously mentioned, a four-stage scan generator is employed. This generator generates a maximum of sixteen different address combinations which are decoded by the decode circuit 44. However, only fifteen addresses are decoded by the decode circuit 44 and are used to select a corresponding horizontal row in the storage circuit 20. The binary fifteen address is employed to operate an inverter circuit (not shown) in the decode circuit 44 to generate an INVALID ADDRESS (IA) signal on a line 46 whenever the binary fifteen is decoded, and a NOT INVALID ADDRESS ($\overline{IA}$) on a line 48 for all other input combinations.

Section 26 of the storage circuit 20 stores the BSU address of those records presently being processed by the processors 2 and 3. In FIG. 1, a plurality of addresses are shown in storage; 364, 291 and 483. Section 24 of the storage circuit 20 stores the row address in which a corresponding BSU address is stored. Section 28 of the storage circuit 20 stores the row addresses in which no BSU address is stored thereby indicating those storage sections available for use.

Row 0′ stores the BSU address 364 and stores either no indicia in its corresponding section 28 or stores a special busy character, 15. In the preferred embodiment, the binary fifteen combination is employed as the busy character. Section 24 of row 0′ stores a 0 in the units position of the section. Rows 2′ and 3′ are presently available for use as indicated by the row address in the section 28. The remaining rows 4′ through 14′ are similar to either of the previously described storage conditions.

Assuming that the contents of the storage circuit 20 are as shown in FIG. 1, the present invention functions in the following manner. The processor 2 sends a record retrieval command to the FCU 4 and specifies that the record being retrieved has a record address of 291. The FCU transfers the record address to the register 14 and generates a SEEK control signal on the line 12. The SEEK control signal starts the scan generator 17 on its scan routine. The first address generated is the binary zero which selects row 0′ by the decode circuit 44 and the horizontal driver circuit 42. The SEEK signal transfers the contents of section 26, row 0′ and the contents of the register 14 to a compare circuit 50. The compare circuit generates a NOT EQUAL signal on a line 52. Both aforementioned transfer operations are of the read-restore type, thereby preserving both indicia for further use. The scan routine continues as long as the SEEK and NOT EQUAL signals are available. Row 1′ is interrogated, transferring the BSU address of 291 to the compare circuit 50. The compare circuit 50 now generates an EQUAL signal on a line 54. The EQUAL signal is applied to the FCU 4, stopping the compare operation and causing a BUSY signal to be sent to the requesting processor 2, over a line 55.

When the scanning of the record directory held in the section 26 is completed and the address of the requested record is not found, the FCU 4 generates a LOAD control signal on a line 56. The LOAD signal interrogates the available address section 28 of the storage circuit 20 searching for a row address at which the BSU address can be stored. For the description of the following LOAD operation, a BSU 6 record address of 500 is used and represented in FIG. 1 by dotted lines. The first two rows are in use. The third row is not in use and stores its corresponding binary address 02 in section 28 indicating its availability. The binary 02 address is transferred by destructive read out techniques to the decode circuit 44 by a line 57 and is used to readdress row 2′. Simultaneously, the 02 address is written into section 24 of row 2′ over a line 57 and the driver circuit 30 and the requested BSU address 500 is transferred from the register 14 to section 26 of row 2′ by a line 58 and the driver circuit 32.

When the processor 2 returns the record to the BSU 6, the FCU generates a WRITE control signal on a line 59 and transfers, the record address 500 to the register 14. The WRITE control signal begins a BSU address comparison operation as previously described. The compare operation again is performed by the compare circuit 50. The finding of the BSU address in the record directory of section 26 is signalled by the generation of an EQUAL control signal from the compare circuit 50. The EQUAL signal causes the contents of the present address section 24 to readdress the row storing the BSU address in its record address section 26 by a line 60 and the decode circuit 44. Then the contents of section 24 is destructively read out and is transferred to the same row in section 28 by a line 60′ and the driver circuit 34 indicating that the row is again available for use. Also, the contents of the section 26 in the same row is destructively read out.

FIG. 2 shows a more specific block diagram of the instant invention wherein the representative set of control signals are described in detail. The same reference numerals are used in FIG. 2 for the same elements.

The drivers 30, 32 and 34 are of standard design and operate with a standard read-write cycle. The read cycle comprises a read-restore operation and the write cycle comprises a standard read in operation.

The read-restore operation of the driver 30 is controlled by an AND gate 62, which gate has two input signals; one of which is the WRITE signal on the line 59, and the other of which is the NOT EQUAL signal on the line 52. The write in operation of the driver 30 is controlled by an OR gate 64 which has two input signals; one of which is from an AND gate 66, and the other of which is from an AND circuit 68. The AND gate 66 has two input signals, one of which is the WRITE signal on the line 59, and the other of which is the EQUAL signal on the line 54. The AND circuit 68 has two input control signals, the first of which is the LOAD signal on the line 56, and the second of which is the $\overline{IA}$ signal on the line 48. The AND gate 68 is shown connected to the sense amplifier circuit 40. Actually, the sense amplifier circuit 40 comprises separate sense amplifier circuits for each record indicia stored in section 28 and each sense amplifier is connected to a corresponding read/write driver by a separate AND gate having the control signals shown connected to the AND gate 68. However, for brevity only a single AND gate is shown.

The read-restore operation of the driver 32 is controlled by an AND gate 70, which gate has two input signals; one of which is the SEEK signal on a line 12, and the other of which is the NOT EQUAL signal on the line 52. The write-in operation of the driver 32 is controlled by an OR gate 72, which gate has two input signals; one of which is from an AND gate 74, and the other of which is from an AND gate 76. The AND gate 74 has two input signals; one of which is the WRITE signal on the line 59, and the other of which is the EQUAL signal on the line 54. The AND gate 76 has two input control signals; one of which is the LOAD signal on the line 56, and the other of which is the IA signal on the line 48. The AND gate 76 also is shown connected to the register 14. The record address from the register 14 passes through the AND gate 76 in the same manner as the address from the sense circuit 40 passes through the AND gate 68.

The read-restore operation of the driver circuit 34 is controlled by an AND gate 78, which has two input signals; one of which is the LOAD signal on line 56, and the other of which is the $\overline{IA}$ signal on the line 46. The write-in operation of the driver circuit 34 is controlled by an OR gate 80 which has two input signals;one of which is from an AND gate 82, and the other of which is from an AND gate 84. The AND gate 82 has two input signals; one of which is the LOAD signal on the line 56, and the other of which is the $\overline{IA}$ signal on the line 48. The AND gate 84 has two input control signals; one of which is the WRITE signal on the line 59 and the second of which is the EQUAL signal on the line 54. The AND gate 84 is shown connected to the sense amplifier circuit 36.

The output signals from the scan generator 17 are applied to the address decode circuit 44 by a standard AND/OR type input mix circuit 86. More specifically, a plurality of OR gates 88 through 91 form the input to the decode circuit 44. Since the decode circuit decodes the address signals furnished from a plurality of sources, each of the OR gates 88 through 91 is equipped with an equal plurality of AND gates. For example, the OR gates 88 receive input signals from a plurality of AND gates 92*a*, 93*a* and 94*a*. The OR gate 91 receives input signals from a plurality of AND gates 92*d*, 93*d* and 94*d*. The remaining OR gates 84 and 90 are equipped with similar AND gates.

Each of the triggers in the scan generator 17 applies its output signal to the decode circuit 44 by the AND gates 92*a* through 92*d* and their corresponding OR circuits 88 through 91 respectively. Each of the AND gates 92*a* through 92*d* has two additional control signals; the first of which is from OR gates 96*a* through 96*d* respectively, and the second of which is a NOT EQUAL signal from a compare unit 50 on a line 52. The OR gates 96*a* through 96*d* have two input signals; the first of which is the SEEK signal on the line 12 and the second of which is a LOAD signal on a line 56.

Each of the AND gates 93*a* through 93*d* has two input control signals; the first of which is the LOAD signal on the line 56, and the second of which is the NOT EQUAL signal on the line 52. The AND gates 93*a* through 93*d* receive an additional data signal from the sense amplifier circuit 40. Each of the AND gates 94*a* through 94*d* has two input control signals; the first of which is an EQUAL signal on a line 54 from the compare circuit 50, and the second of which is a WRITE signal on a line 59. The AND gates 94*a* through 94*d* receive an additional data signal from the sense amplifier circuit 36.

The OR gate 18 has four input signals; the first of which is the SEEK control signal on the line 12, the second of which is the LOAD control signal on the line 56, the third of which is the WRITE control signal on the line 59, and the fourth of which is the IA control signal on the line 46. One of the three signals on the lines 12, 56 and 59 causes the scan generator to start its scan routine. When the WRITE control signal starts the scan routine, the routine continues as long as the IA signal is present.

The read-restore operation of the register 14 is controlled by an OR gate 98. The OR gate has two input signals; one of which is from an AND gate 100, and the other of which is the SEEK signal on the line 12. The AND gate 100 has two input signals; one of which is the LOAD signal on the line 56, and the other of which is the $\overline{IA}$ signal on the line 48.

In a first mode of operation, the FCU 4 receives a command word from the processor 3 specifying the address of the record sought and the type of command that the FCU 4 is to control. The address is applied to the record address register 14 and the FCU generates a SEEK control signal indicating the type of operation being performed. The SEEK signal on the line 12 starts the scan generator 17 on its scanning routine. The first address is applied to the address decode circuit 44 by the AND gates 92*a* through 92*d* and the OR circuits 88 through 91 respectively. At this time, the output signal from the compare unit is NOT EQUAL. The first address selects row 0′ of the storage circuit 20 and reads out the contents of the record address section 26 into the compare unit 50. Simultaneously, the BSU address in the register 14 is sampled by the SEEK control signal, and it is transferred to the compare unit 50 for comparison with the address in the record address section 26. A NOT EQUAL signal from the unit 50 continues the application of succeeding addresses from the scan generator to the decorder 44. A compare EQUAL signal indicates that the identified record is presently being processed. The EQUAL signal is applied to the FCU 4 which prepares a BUSY signal for application to the processor 2 over a line 55′. When the record address is not found, the scan generator finishes its cycle with its maximum address position, a binary fifteen. For the purposes of this description, the binary fifteen is an invalid address (IA) since the circuit 20 contains only fifteen storage rows. However, the binary fifteen has been selected to perform special functions; one of which is described hereinafter, and the other is its application to the FCU on the line 46 indicating that all storage locations have been scanned. The IA signal on line 46, the NOT EQUAL signal on line 52, and the SEEK signal are combined by the FCU 4 to form a LOAD signal on the line 56.

The LOAD signal indicates that the desired record is available for processing and is not presently being processed by the same processor or with another processor. In those systems requiring more than one command to retrieve a record, the LOAD signal is sent back to the processor indicating that the record retrieval operation may continue. Additionally, the LOAD signal is applied to the scan generator 17 causing the generator 17 to run through its scan routine a second time. The LOAD signal is applied to the AND gates 92*a* through 92*d* by the OR gate 96*a* through 96*d* respectively, allowing the output of the scan generator to be decoded in the circuit 44 and to select successive storage locations in the storage circuit 20. The LOAD signal is applied to the AND gates 93*a* through 93*d* enabling the contents of the available address section 28 to be applied to the address decode circuit 44. For each INVALID ADDRESS signal generated in response to a binary fifteen address from the interrogated location in section 44, a successive location is interrogated. Upon the location of a valid address, the corresponding location is simultaneously re-addressed by the contents of the interrogated section 28. The address is written into the present address section 24 by the read/write driver section 30, the record address is written into the section 26 by the write driver section 32 and the available address location has a binary fifteen written therein by the write driver section 34.

The record address is removed from the record address section 26 of the storage circuit 20 during a WRITE command initiated by the processor 3. The FCU 4 generates a WRITE signal on the line 59 which initiates a scan generator 17 routine. A record address comparison operation is performed until the compare unit 50 generates an EQUAL signal. With this combination of enabling signals, the contents of the present address section 24 is employed to address the storage circuit 20 by the AND gates 94*a* through 94*d* and the address decode circuit 44. The row address in the present address section 24 is destructively read out and is transferred to the section 28 by the AND gate 84 and the driver circuit 34. Therefore, the addressed location is available for the next record retrieval operation.

An alternate embodiment of the instant invention, constructed to operate with a processor performing a key search, stores the key information in the section 26 of the storage circuit 20. In this embodiment the key information is the indicia by which a record in the BSU 6 is identified.

Also, a further embodiment of the instant invention can be constructed to operate with a key search operation wherein the address of the record identified during the key search is retrieved before the entire record is retrieved. In this last instance, the invention would operate in the manner described with the preferred embodiment after the key search operation is completed. Since no records are removed for processing until the retrieval by address operation, the objects of the instant invention are met.

A still further embodiment of the instant invention contemplates the use of a storage circuit 20 having only two sections 26 and 28. The function of the addition section 24 can be accomplished by forcing a fifteen into the row in which a record address is to be stored.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A record retrieval system comprising,
a bulk storage unit for storing a plurality of records,
an electronic data processor operating in response to a stored program for processing records stored in said bulk storage unit,
said program including a plurality of separate commands,
certain of said commands including address indicia for identifying particular ones of said records,
means responsive to said commands for retrieving an identified record from said bulk storage unit,
means comprising a static address register responsive to said commands for maintaining a directory of identifying address indicia for records being processed by said processor,
compare means for comparing the identifying address indicia of one of said commands and identifying address indicia stored in said directory address register for determining the availability of said identified record for processing,
signal means governed by said compare means for permitting said processor to read said identified record, and
means for loading said identifying address indicia into said address register.

2. A record retrieval system as recited in claim 1 and further including,
means responsive to said commands for withdrawing said identifying address indicia from said directory address register after the processing of its associated record is complete.

3. A record retrieval system comprising,
a bulk storage unit for storing a plurality of records,
each of said records including identifying address indicia,
a plurality of data processors connected to said bulk storage unit,
each of said processors operating in response to a stored program for processing records stored in said bulk storage unit,
means responsive to each of said stored programs for retrieving records from said storage unit,
a static address register means for maintaining a directory of said identifying address indicia as records are retrieved from said bulk storage unit, and
means governed by said address register means for preventing the retrieval of one of said records in response to one of said programs before the processing of the same record in response to another of said programs is complete.

References Cited

Rowe: "Record Hold Arrangement," IBM Technical Disclosure Bulletin, vol. 5, No. 6, November, 1962, page 61.

PAUL HENON, *Primary Examiner.*

U.S. Cl. X.R.

340—174.1